United States Patent [19]
Chazelle et al.

[11] Patent Number: 5,526,000
[45] Date of Patent: Jun. 11, 1996

[54] PROCEDURE AND AUTOMATIC CONTROL DEVICE FOR AN AIRBORNE VEHICLE IN LOW ALTITUDE OVERFLIGHT

[75] Inventors: Xavier Chazelle; Jean-Pierre Desvigne, both of Saint Cloud, France

[73] Assignee: Electronique Serge Dassault, Saint Cloud, France

[21] Appl. No.: 172,304

[22] Filed: Mar. 10, 1988

[51] Int. Cl.$^6$ .................................................. G01S 1/08
[52] U.S. Cl. ............................................................ 342/407
[58] Field of Search ............................................... 342/407

Primary Examiner—David C. Cain
Attorney, Agent, or Firm—Nixon & Vanderhye

[57] ABSTRACT

The so-called flight path of an aircraft is defined in the form of a set of successive target points ($B_i-1$, $B_i$, $B_i+1$) with a target circle ($CB_i$) associated with each target point. A navigation envelope (DN) is determined in she direction to this target, and a guidance envelope (DH) is determined in the direction of the next target, for each target point. Normally, the aircraft is in the navigation envelope, and reenters the guidance envelope, then the target circle ($B_i$) after which it heads in the direction of the navigation envelope associated with the next target. In the contrary case, a mandatory switching envelope (DCF) determines the instant when the aircraft is to orient itself on the next target ($B_i+1$).

15 Claims, 14 Drawing Sheets

PROCEDURE AND AUTOMATIC CONTROL DEVICE FOR AN AIRBORNE VEHICLE IN LOW ALTITUDE OVERFLIGHT

BACKGROUND OF THE INVENTION

1. Field of the Invention

The invention concerns automatic control of an airborne vehicle in low altitude overflight.

2. Discussion of Prior Art

French Patent Application No. 84 10263, deposited on Jun. 28, 1984, in the name of the Applicant, described a technique that can be called "terrain following." The question in that case was how to define the command signals for the airborne vehicle's servo motors so as to optimize the flight path flown by the airborne vehicle, while at the same time taking into consideration the relief, and other obstacles the vehicle may have to overfly. This prior Patent Application was concerned with what takes place in a vertical plane containing the airborne vehicle's speed vector.

SUMMARY OF THE INVENTION

The present invention goes well beyond the prior Patent Application, because now the behavior of the airborne vehicle, or, more simply put, the aircraft, in horizontal directions will be examined. Accordingly, the present invention includes "terrain avoidance" (abbreviated EDT).

Although the published technical literature contains very little on this subject, it is here considered that the manner in which the following steps are implemented is known:

- set of real time aircraft parameters representing the airborne vehicle's instantaneous flight path is acquired;
- set of terrain data representing the topography of the region the airborne vehicle is Setting ready to overfly is available; and
- a route for the overflight of this region at low altitude as a function of the so-called flight path assigned to the airborne vehicle (the flight plan), is selected.

The main purpose of the present invention is to make a considerable improvement in this technique.

More precisely, the purpose of the invention is to enable an aircraft to optimize its flight path, with its flight plan, and the environment it will encounter, taken into consideration.

Another purpose of the invention, however, is to permit deviations from the flight path when an unexpected obstacle, such as a threat, appears ahead of the airborne vehicle, while at the same time avoiding, in so far as possible, having to climb, or to make a drastic course change.

To begin with, the invention provides a procedure of the type already cited, one that is remarkable for the following operations, which concern the components of the aforesaid route in a horizontal plane:

(a) the so-called flight path is stored in the form of digital coordinates of a sequence of target points ($B_i$), associated with each of which is at least one other suitable value so as to define a target zone around a target point, such as a circle ($CB_i$) centered in the target point ($B_i$), and for which the aforesaid other digital value is the radius;

(b) there is determined for this target point ($B_i$), toward which the aircraft is headed, at least one aiming envelope (DV) in a preselected geometric relationship with the target zone ($CB_i$), defined by an angular sector having an apex (PV) that points toward the downstream side of the aircraft's flight path, this sector approximately inscribing the entire target zone ($CB_i$), and its bisector approximately passing through the target point ($B_i$);

(c) terrain data are used to determine a digital performance function (FPR) for each direction, or bearing corridor, which constitutes an evaluation of the optimum advance, starting out in accordance with this direction, as a function of a preselected set of criterium that includes the flight altitude;

d) using the aforesaid aiming envelope, a digital degradation function (FPN) is determined, tending to maintain the aircraft within this aiming envelope (DV), or to bring it back into this envelope all the more firmly the more and more quickly it deviates, for each direction the aircraft can use at the present time; and (e) the optimum route is determined from the performance and degradation functions associated with the corridors the aircraft can use at the present time.

By preference, operation (c) includes the following steps:

(c1)—a digital consequence function (FC), associating, at each range register for each bearing corridor, an evaluation magnitude based on at least one part of the aforesaid criterium, is determined; and (c2)—a digital performance function (FPR) is determined in accordance with the weighted sum of the consequence functions found from a step-by-step progression among the successive range registers with a limited bearing change at each step.

In practice, operation (e) results in route slaving that determines the steering commands for the aircraft such as to slave the aircraft to the aforesaid optimum route.

Paralleling this is the determination, in accordance with the optimum route. of the terrain-following commands that concern piloting the aircraft in the vertical plane. Thus, the command sent to the aircraft integrates, in a combined way, the terrain-avoidance command and this terrain-following command to arrive at a definitive route (which can be different from the optimum route).

In accordance with a special aspect of the invention, operation (b) includes for each target ($B_i$) the establishment of a navigation envelope (DN), and a guidance envelope (DH), both in the form of an angular sector (PN, PH) pointing downstream, the navigation envelope (DN) open, and containing the route that joins the preceding target ($B_i-1$) to the present target ($B_i$), and the guidance envelope (DH) closed, being approximately coaxial with the direction from the present target ($B_i$) to the next target ($B_i+1$), the aiming envelope (DV) being first the navigation envelope (DN), then the guidance envelope (DH), when this latter is penetrated by the aircraft, and then the navigation envelope associated with the next target.

Very advantageously, entry is into the navigation envelope associated with the next target ($B_i+1$) when the aircraft has penetrated the present target ($B_i$) circle, and which it has approximated in a preselected manner from the axial route of the guidance envelope (DH), or when the aircraft has penetrated a mandatory switching envelope (DCF) outside the guidance envelope (DH), and the present target circle ($CB_i$), and the upstream limit of which is close to the bisector of the angle formed by the preceding target ($B_i-1$), the present target ($B_i$), and the next target ($B_i+1$).

In accordance with another aspect of the invention, operation (d) establishes a rigid, or constraining, command when the aircraft is in the guidance envelope, and a flexible command when the aircraft is in the navigation envelope.

Entry also is made into the navigation envelope (DN) associated with the next target ($B_i+1$) when the aircraft has penetrated the guidance envelope (DH), and there has been encountered a threat, at least such is the case for certain applications.

In one preferred version of the invention, the boundaries of the navigation envelope and of the guidance envelope make an angle ($\beta_{max}$) with the respective straight lines defined by the three targets considered. The guidance envelope (DH) is tangent to the associated target circle ($CB_i$), the whole being closed, at the outside of this target circle ($CB_i$) and on the opposite side of its apex (PH) by a preselected curve such that if the aircraft is tangential to this curve it can remain inside the guidance envelope (DH). The navigation envelope (DN), in turn, passes through the point of tangency ($F_1$) between the guidance envelope (DH) and the target circle ($CB_i$), on acute side of the angle formed by the three targets ($B_i-1$, $B_i$, $B_i+1$), itself tangent at point ($F_2$) to the target circle ($CB_i$) on the other side. Finally, the mandatory switching envelope (DCF) includes the downstream half-plane delimited by the straight line joining the aforesaid points of tangency (F1, F2), exclusive of the guidance envelope (DH) and the target circle ($CB_i$).

In accordance with other aspects of the invention:

- the determination (c1) of the consequence function includes leveling the altitude of any point at the maximum altitude that had been encountered at preceding points in the same bearing corridor;
- the determination (c2) of the performance function takes into account lateral clearance of obstacles present in at least an adjacent corridor;
- weighting at the (c2) step is in accordance with a hyperbolic function of range;
- the determination of the degradation function at step (d) takes into account angle ($\beta$) between the straight line joining the aircraft (A) at apex (PV) of the aiming envelope (DV) and the axis (AV) of this aiming envelope, the temporal derivative ($\dot{\beta}$) of this angle, and angle ($\alpha$), formed by the aircraft's horizontal speed vector (VH) and the aforesaid straight line.

In accordance with another, important, aspect of the invention, the control signal for the aircraft combines the terrain-following and terrain avoidance commands in a different way, depending on whether or not the corresponding route is within a "straight line" sector with a predetermined angular width.

The invention also offers a device for implementing the above procedure, a device that includes:

- facilities for the acquisition of instantaneous aircraft flight parameters and for determining the navigation parameters;
- facilities for processing and mass storage suitable for data storage, in particular, data on threats the aircraft can encounter;
- calculation and storage facilities suitable for cooperating with the processing facilities to define at least one envelope as a function of a present target ($B_i$), with the intention of the aforesaid facilitates that of determining navigation parameters;
- target switching logic facilities as a function of aircraft position with respect to this, or to the aforesaid envelopes;
- terrain data storage filled with data, such as that from a radar; and
- a high-speed computer suitable for determining consequence performance, and degradation functions from flight path data relative to the envelope supplied to it by the processor and from the content of the terrain storage, in order to establish a controlled course change for the aircraft as a function of its current flight path. This device is advantageously complemented by:
- facilities supplying a terrain-avoidance command based on the controlled course change;
- facilities generating a terrain-following command for each possible route;
- facilities generating a definitive command signal for the aircraft as a function of the terrain-avoidance and terrain-following commands.

BRIEF DESCRIPTION OF THE DRAWINGS

Other characteristics and advantages of the invention will become apparent study of the detailed description that follows in conjunction with attached drawings, where.

DETAILED DESCRIPTION OF PREFERRED EMBODIMENTS

It is evident that the attached drawings essentially define geometric, written data of a certain nature. They are, therefore, incorporated in this description to complete, and to contribute to, the definition of the invention.

Figure 1:
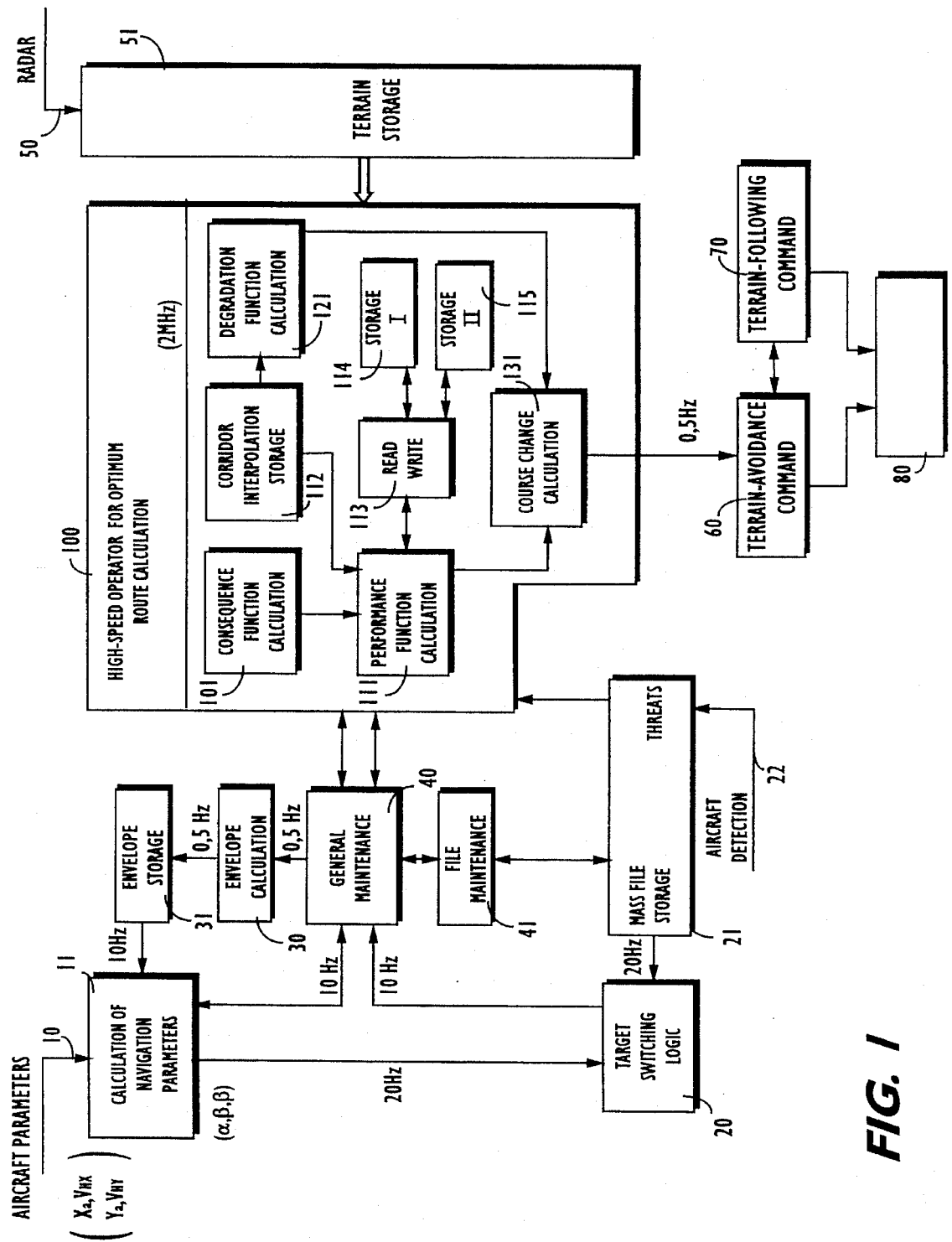
FIG. 1 is a general block diagram of a device implementing the invention.

FIG. 1 is a block diagram of a device for controlling an airborne vehicle terrain avoidance in accordance with the invention.

Aircraft parameters are supplied over line 10. They are the horizontal coordinates of point A, $x_A$ and $Y_A$, in which the aircraft is found, and the corresponding horizontal components of its speed vector, $VH_x$ and $VH_y$.

Figure 1A:
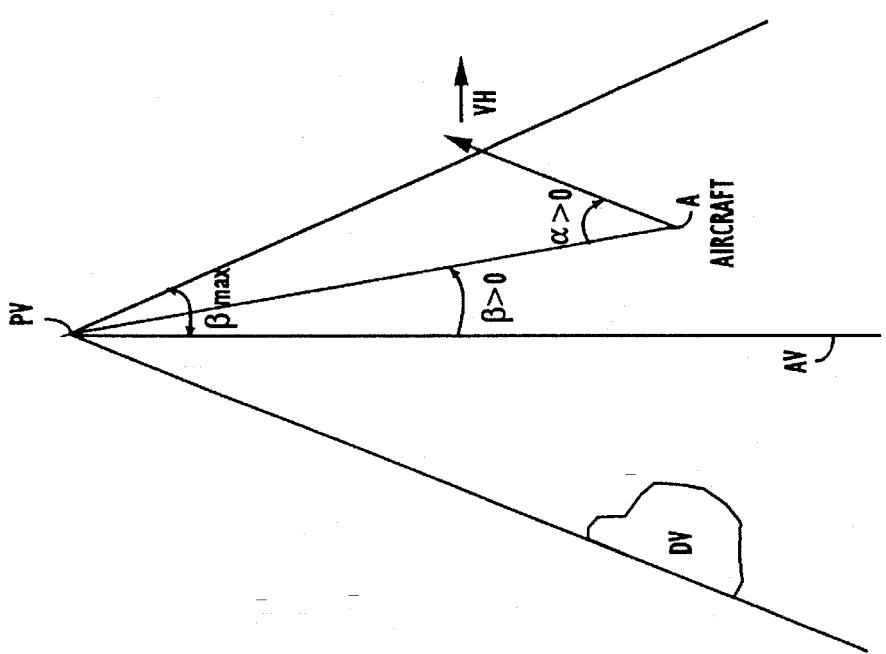
FIG. 1A is a horizontal plane view of a geometric figure illustrating the definition of the navigation parameters relative to an envelope.

An aiming point being given (provisionally designated PV, FIG. 1A), circuit 11 deduces, in a known manner, the navigation (or aiming) parameters, which are:

α, the aiming angle formed by the aircraft's horizontal speed vector, $\overline{VH}$, and the direction of the aiming point (with respect to the aircraft);

$\beta$, the angle formed by the straight line A-PV in a preselected direction, AV, and passing through PV; and the temporal derivative of $\beta$, designated $\dot{\beta}$.

An envelope, DV, begins at point PV, and is delimited by an angular sector defined by its half-angle at the apex, $\beta_{max}$, and the direction, AV, of its axis of symmetry. This envelope is turned toward the aircraft and thus toward the upstream side with respect to the aircraft's flight path (it will be seen in what follows that PV is a point at which the aircraft aims).

Envelope storage 31 contains the digital values defining the envelope. This storage reads out at the rate of 10 Hz (all rates are presented as examples) such data useful to computer 11 as:

PV coordinates;

components of the unit vector of direction AV.

Computer 11 reads out (at 20 Hz) digital values ($\alpha$, $\beta$, $\dot{\beta}$) to a target switching logic unit, designated 20. The function of this unit is to define the instant the target changes, and does so as will be described in what follows.

This takes place by taking into account threats, or other possible obstacles, that can appear suddenly in front of the aircraft. Detection of such threats can be accomplished in many ways, all known to the expert. It is taken that data concerning threats detected arrive over line 22 as received. These data (threat situation parameters, and parameters on the zone in which the threat is active) are accumulated in mass storage 21, which forms the "threat data file." Storage 21 also can contain advance data on fixed, and known, threats, as well as other pertinent information.

Data file storage 21 is managed by general maintenance unit 40 through a file maintenance circuit, 41. The role of unit 40 here is to keep the file up to date by interpreting data received over line 22, and in this way ensure (at a 20 Hz rate) the presentation to logic unit 20 of threat data that are pertinent to that unit. Unit 40 also ensures transfer to assembly 100 (described in what follows) navigation and threat data used by it.

Logic 20 indicates the present aiming point (PV) (at a 10 Hz rate) to maintenance unit 40, which, at the same rate, receives already cited parameters ($\alpha$, $\beta$, $\dot{\beta}$) from computer 11.

The expert will understand that the calculation of the navigation parameters, and threat maintenance, take place in parallel at the rate of 20 Hz, whereas these two operations take place in series upon operation of target switching logic 20, but here the response is at 10 Hz.

Finally, the maintenance unit transmits data on the present aiming point at a lesser rate (0.5 Hz) to envelope computer 30, which updates the content of envelope storage 31.

Given all of the above, general maintenance 40 transmits all data on the present aiming point and the navigation parameters for the airborne vehicle to a high-speed computer, 100.

During this time, terrain storage 51 is filled with data on the topography of the terrain it is expected the aircraft will be overflying. These data are provided primarily by the airborne radar, from its extractor output, 50 (digital output), or from other sensors. These data also can be prerecorded.

Unit 100, which functions as a 2 MHz clock, and is by preference, wired, includes:

computer 101, that calculates a function called "consequence";

if necessary, a corridor interpolation storage, 112 (depending on the fineness of the resolution, into bearing corridors available in terrain storage 51);

computer 111, that calculates a function called "performance";

a read/write circuit, 113, in two storages, 114,115, functioning alternately (for reading on one side and writing on the other);

computer 121, that calculates a function called "degradation;

computer 131, that calculates the anticipated course change for the airborne vehicle.

The output from computer 131 is supplied at the rate of 0.5 Hz to circuit 60, which generates command signals concerned with terrain avoidance (horizontal plane).

Circuit 60 is associated with circuit 70, which latter generates terrain-following commands (vertical plane).

A final unit, 80, couples the two commands, combining them to deliver definitive commands to the aircraft.

Figure 2:
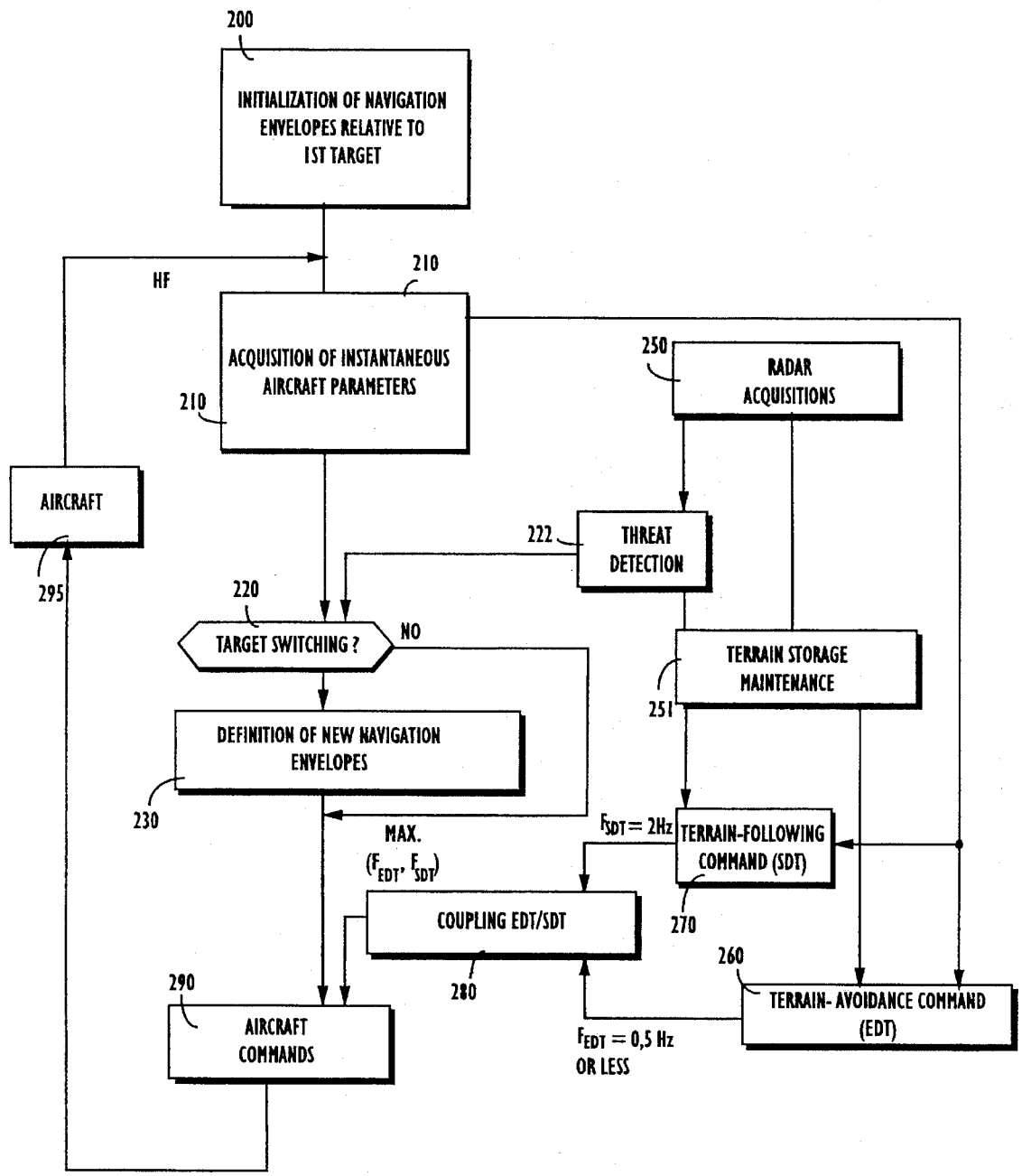
FIG. 2 is a general block diagram of the functioning of the device in accordance with the invention.

The functions described above have been diagrammed in the order in which they take place in FIG. 2, where the response of the servo mechanisms in the aircraft appear as 295. An initialization step for the first target appears at 200. The first of the units in FIG. 2, while their numbers appear in the 200s, correspond to those shown in FIG. 1.

Figure 3:
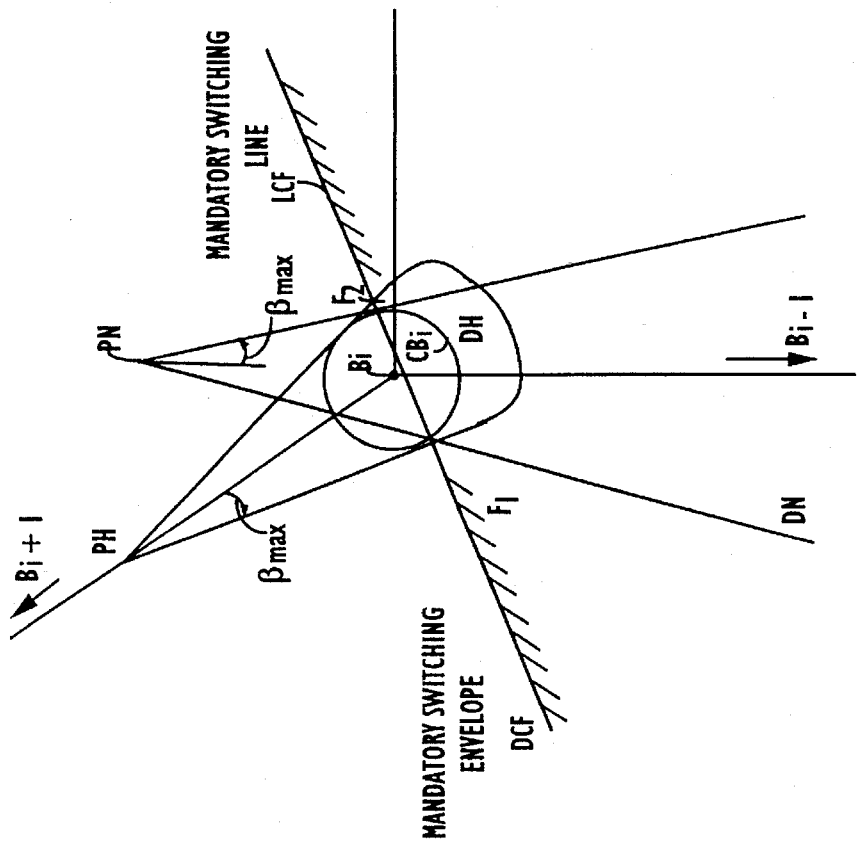
FIG. 3 is a geometric figure showing a sequence of envelopes relative to a present target.

Reference now is made to FIG. 3. The so-called flight path flown a priority the aircraft is defined by a series of targets $B_i$, that has already taken into account geographic and/or military data. It is considered that the aircraft is found between target $B_i-1$ and target $B_i$, which will be followed by target $B_i+1$.

A target zone here the target circle $CB_i$, centered in target $B_i$, and of preselected radius, variable for each target, provided it remains greater than a threshold, is defined in the horizontal plane around each target $B_i$. that a sector of apex PH and of the half-angle at the apex, $B_{max}$, exactly A guidance, or homing point, PH, is defined on the $B_i$, $B_i+1$ axis, such that a sector of apex PH and of the half-angle at the apex, $\beta_{max}$, exactly inscribes target circle $CB_i$. Note that $F_1$ is the point of tangency of this sector with target circle $CB_i$, of the acute side of the angle formed by the three targets $B_i-1$, $B_i$, and $B_i+1$. The sector of apex PH forms a guidance or homing envelope, DH, which, as opposed to point PH, is closed by the continuous arcs of a circle (here three), the preselected radii of which are, preferably, selected as a function of the maximum in the range of minimum banked turn radii authorized for the airborne vehicle.

Defined in addition is navigation point PN, such that a sector of apex PN, turned toward the aircraft (and thus upstream), and the half-angle at the apex, $\beta_{max}$, passes at previously cited point $F_1$ on one side to form angle $\beta_{max}$ with the direction $B_i+B_i$ and tangent on its other side to the $B_i$ target circle at point $F_2$. This sector forms a navigation envelope, designated DN, open toward the upstream side.

Previously cited point PV, the associated envelope DV, and its axis AV, thus will be:

PN, DN, and its axis parallel to $B_i-1$, $B_i$;

or PH, DH, and the $B_i$, $B_i+1$ axis;

or a new PN, DN . . . , but associated with target $B_1+1$ and its target circle $CB_i+1$, and so on.

The half-angles at the apex of DN and DH can be different in practice.

Another envelope, different in nature, is illustrated in FIG. 3. The line $F_1,F_2$ forms the upstream boundary, LCF, of a mandatory switching envelope, DCF, consisting of a half-plane delimited by LCF, and containing point PH, but not guidance envelope DH.

Figure 4:
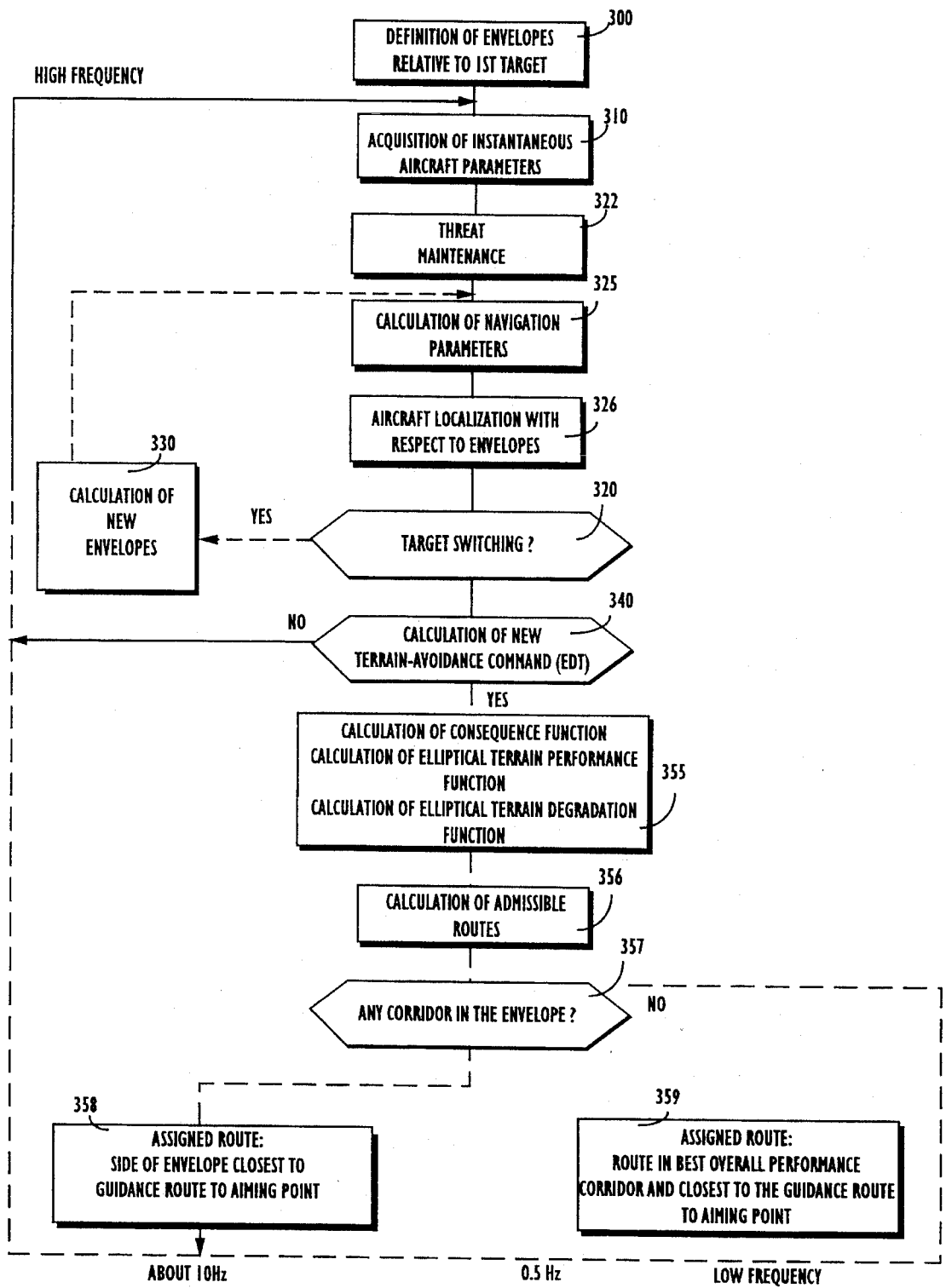
FIG. 4 is a more precise block diagram of the functioning of the device accordance with the invention.

Consider now tile sequential diagram in FIG. 4, which goes back to the functions in FIG. 2, but with more precision. The FIG. 4 diagram includes:

the slow functions, illustrated by the long broken line;

the low-frequency functions (0.5 Hz), illustrated by the axis line;

the fastest functions (about 10 Hz), illustrated by the continuous line.

Initialization operation 200 (FIG. 2) now appears as 300 (FIG. 4), as does 310 for 210, and 322 for 222, with the observation that the threats can be picked up by the airborne radar as well.

It now is understood that the operator of computer 11 (FIG. 1) will take into account the navigation, DN, and the guidance, DH, envelopes associated with the present target, and possibly with the next target as well.

Step 326 thus consists of aircraft Localization with respect to these envelopes.

Figure 5:
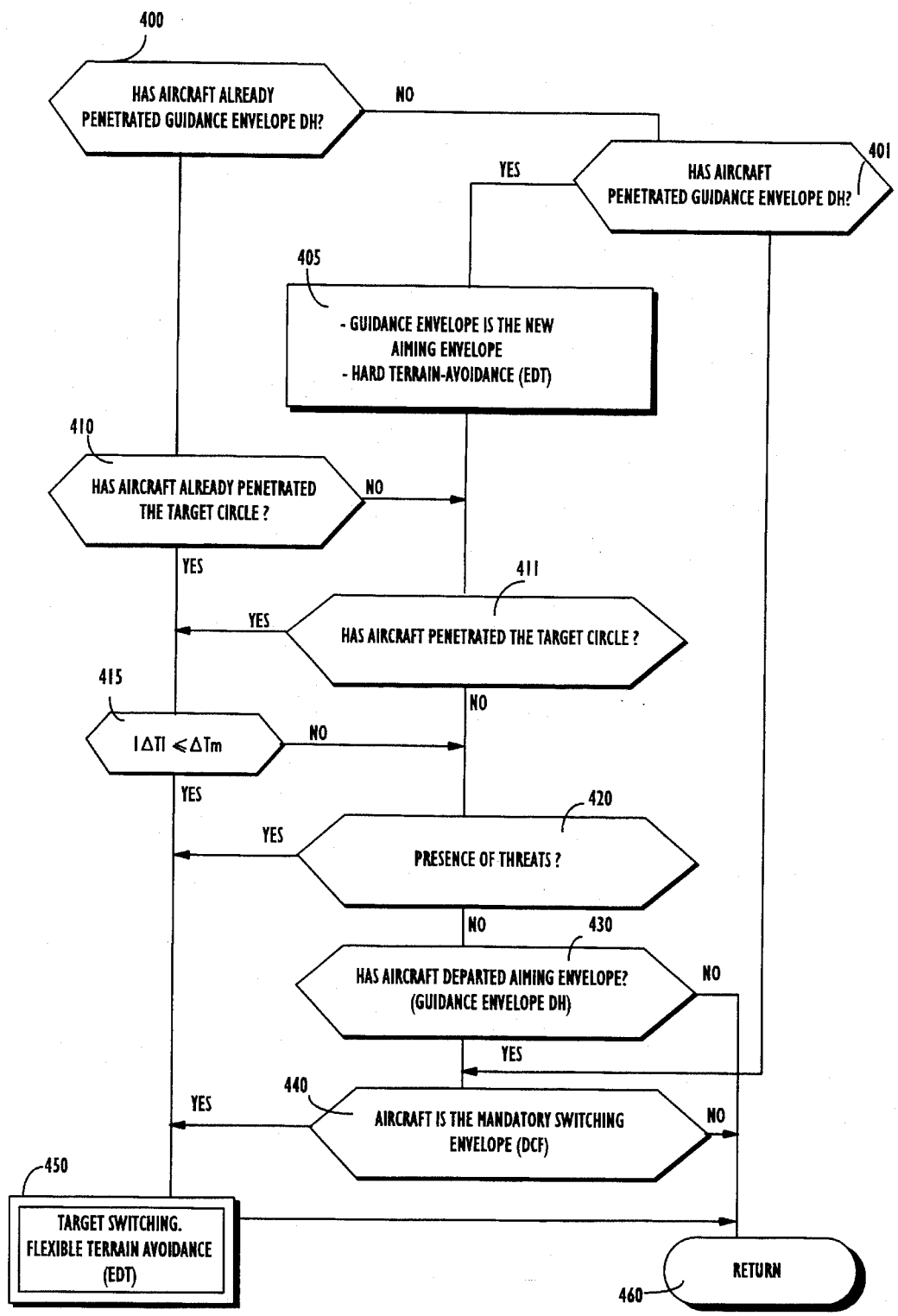
FIG. 5 is a block diagram that once again details one step of that in FIG. 4.

This step is followed by step 320, which condenses the functioning of target switching logic 20 (FIG. 5). Step 330 calculates the new envelopes, DN and DH (30, FIG. 1), if the target is changed, and return is to 325.

FIG. 5 explains the sequence diagram in accordance with which logic 20 operates. In this figure, the aiming envelope, DV, is that of envelopes DN and DH used to establish the aircraft controls.

The assumption, looking at the diagram, is implicit that the aircraft takes the navigation envelope, DN, associated with the present target, $B_i$, for the "aiming envelope."

Step 400 tests to see if the aircraft has in fact already penetrated guidance envelope DH. This thus already is the aiming envelope. Step 401 tests to see if the aircraft is in the process of penetrating the guidance envelope, DH, and, if this is the case, step 405 establishes that the guidance envelope is now taken as the aiming envelope, and terrain avoidance (EDT) is hardened, that is, that the aircraft will be more firmly constrained, as far as its flight path is concerned, than when the aiming envelope is the navigation envelope, with EDT flexible.

Steps 410 and 411 test to see if the aircraft has already penetrated target circle $CB_i$, or if it is in the process of doing so. If "yes" step 415 determines the deviation $|\Delta r|$ between the route followed by the aircraft and the guidance route to the future target (the $B_i$, $B_i+1$ axis FIG. 3), and tests to see if this deviation is below a preselected threshold. $\Delta r_m$, in absolute terms. If "yes" unit 450 switches targets, that is, $B_i$ is replaced by $B_i+1$, with all the consequences that results from doing so in the envelopes.

When the aircraft is controlled with DV = DH (the aiming envelope is the guidance envelope: the output from 411 is "no") target switching takes place if:

threat appears (step 420);

the aircraft has just departed the aiming envelope (step 430).

The situation is the same when the aircraft is controlled with DV = DN the aiming envelope always is the navigation envelope for target $B_i$; the output from 401 is "no" ), seeing that the aircraft enters the mandatory switching envelope, DCF (step 440).

The final return step, 460, returns to step 320 with a "yes" or a "no" result in all cases.

The functions illustrated in FIG. 5 are realizable by the expert, who will be able to draw up a detailed block diagram, it being observed that:

steps 400, 401, 410, 411, 430 and 440 and possibly 420, involve what are, primarily, tests of geometric magnitudes;

step 405 includes a change in the aiming point, and a new calculation of the aiming envelope, the establishment of firm, or "hard," terrain avoidance (EDT), and, of course, the calculation of new aircraft navigation parameters with respect to the guidance, or homing, envelope, DH, which becomes the aiming envelope;

step 415 can be in the form of a test of the angular deviation between the route being flown and the route toward the future target.

All of this describes in detail step 320 in FIG. 4, the sequence of which will now be examined.

Test 340 returns the device to 310 if the calculation of a new terrain-avoidance (EDT) command is not necessary, the restoration rates taken into consideration.

In the contrary case, step 355 calculates the three functions, consequence, performance, arid degradation (calculating the digital values deriving from the functions). This calculation is made:

in series for the consequence and performance functions;

in parallel with the two preceding functions for the degradation function.

The remainder of the calculation, made in series with the set of function calculations, includes:

in 356, the calculation of the envelope of admissible routes, with, in 357, a test to see if there is, or is not, an admissible corridor in this envelope, then, following this test:

in 358, the aircraft is forced to fly an extreme controlled route; the limit of the envelope that is the closest to the guidance, or homing route to the present aiming point, or else in 359, the best overall "performance" corridor, and the one closest to the route for homing on the aiming point, is selected.

These calculations now will be described in more detail.

Consequence function

The consequence function is calculated with all range registers used to avoid the terrain for all corridors in actual fact scanned by the radar.

Depending on the type of radar, two cases can be presented:

(a) a radar with low bearing resolution, supplying a reduced number of corridors typicallly three or four corridors each about 10° wide with a 2° overlap:

(b) a radar with high bearing resolution, supplying numerous narrow corridors with little absolute overlap.

The Applicant has observed that it is necessary to introduce lateral clearance in order to obtain correct terrain avoidance, the clearance such that the aircraft does not pass too close to an obstacle. This clearance, in case (a), is provided by the overlap between adjacent corridors.

This overlap is inadequate, in case (b), and lateral clearance is introduced (combined with the vertical clearance of terrain following) in the form of a transverse elliptical function, defined by the isorange registers.

Figure 6:
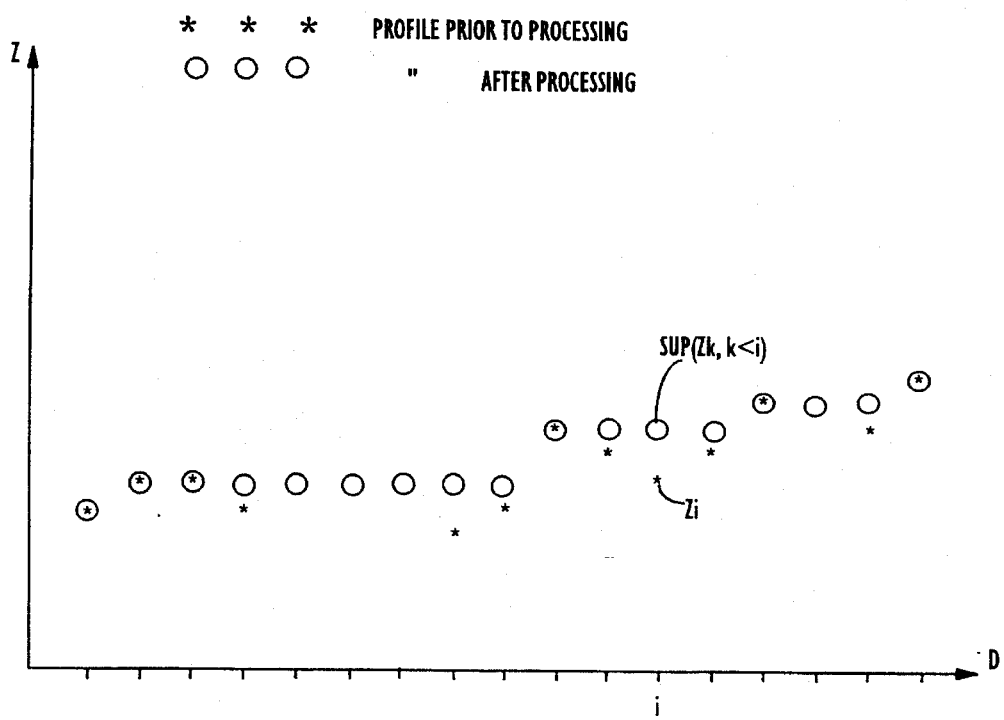
FIG. 6 is a consequence function diagram.
Figure 7:
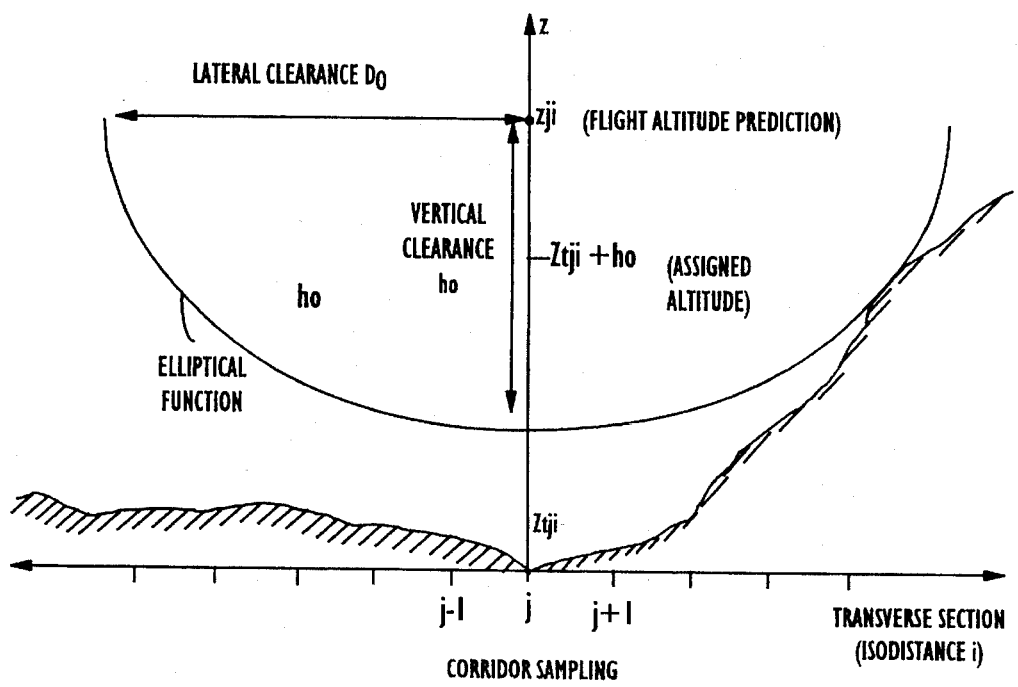
FIGS. 7 through 10 are diagrams concerned with the performance function.

The consequence function calculation thus includes two stages:

corridor by corridor processing at ascending ranges:

in any register i, elevation $Z_i$, that detected by the radar, is, if necessary, increased to the maximum elevation encountered at shorter ranges, and is written $Z_i \rightarrow \sup [Z_i, \sup (Z_k \text{ when } k<i]$ the effect of which is illustrated in FIG. 6;

transverse processing for all isorange registers in view of a flight altitude "prediction":

case (a), low resolution radar, the consequence function is $$FC_{ji} = Z_{ji} + h_o - z_a$$

where j is the corridor subscript:

i is the range subscript (range register);

$h_o$ is an overflight altitude instruction;

$z_a$ is the aircraft's instantaneous altitude;

case (b), radar with a goodly number of corridors:

the aforecited elliptical function, an example of which is illustrated in FIG. 7, yields flight altitude $z_{ji}$ in the vicinity of an obstacle. The consequence function then is written $$FC_{ji} = z_{ji} - z_a.$$

It is apparent that the function $FC_{ji}$ thus determined represents the "consequence" in terms of the increase in altitude for each corridor, and for each range in this corridor. It is possible, of course, to integrate other criterium in this consequence function, in particular:

threats that are, or are not, assimilated to the relief;

a distinction, in accordance with which a relief point is in a shadow zone, or in an illuminated zone, for a detector, of the airborne type, for example;

the intervention of other factors, changing, such as fuel reserves, or schedule imperatives, in particular;

so that it is possible to deduce an artificial modification of the real relief (an excessive increase in altitude, most often).

Performance function

Figure 8:
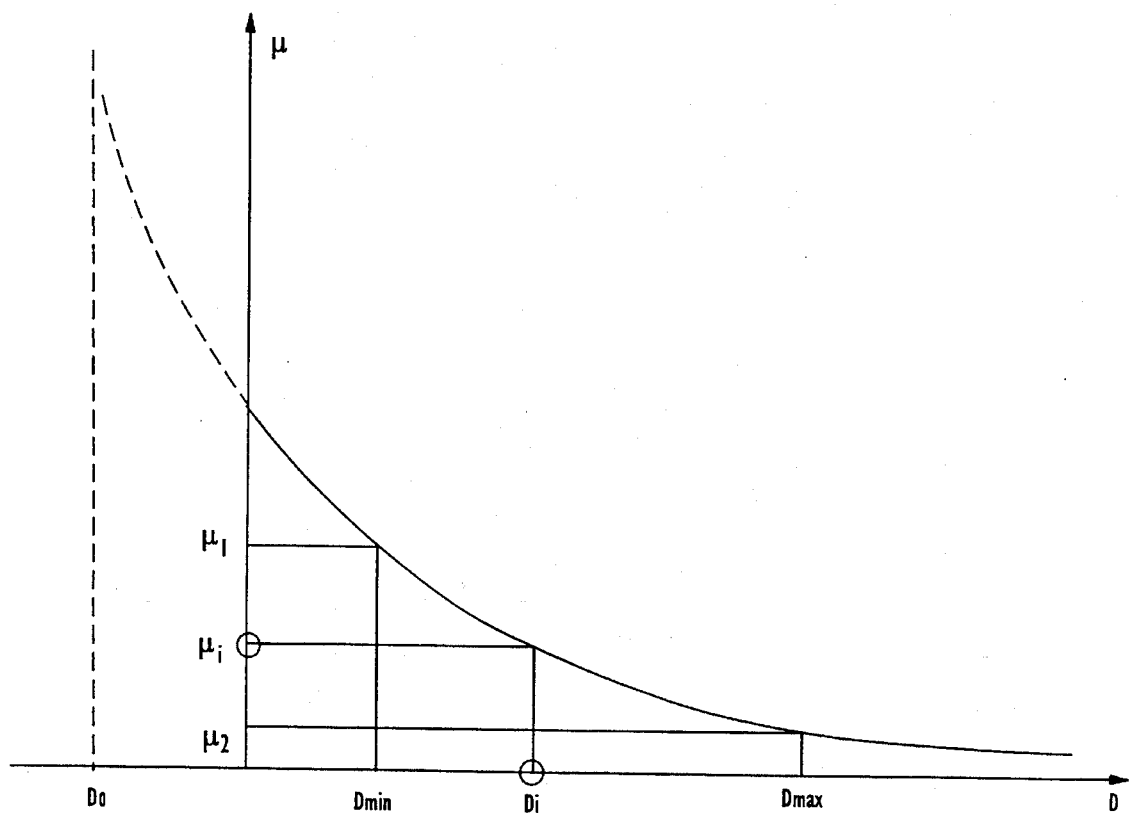

Designated FPR, this function is calculated for each corridor between range registers $i_{min}$ and $i_{max}$ (these ranks are preselected). The corresponding consequence function, $FC_{ij}$, is weighted for each value of i as a function of the range by coefficients $\mu_i$ of a hyperbolic law (FIG. 8). Their sum for a corridor is a constant, designated $S_\mu$. In the (a) case (few corridors), the consequence function is interpolated beforehand so as to obtain 1000 fictitious corriders for bearing resolution $\Delta\theta$ of the order of 1 milliradian.

Figure 9:
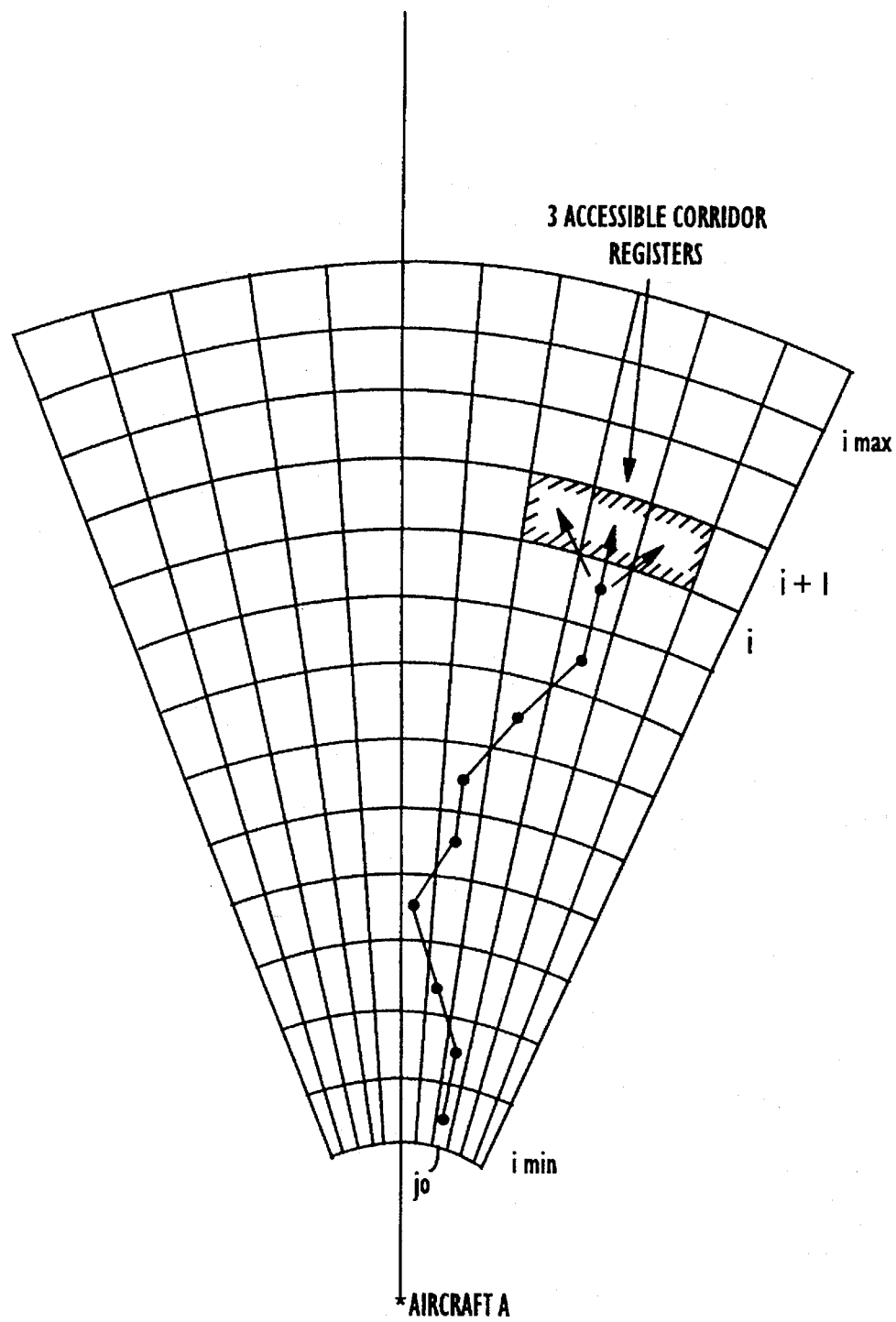

FIG. 9 shows the manner in which the performance function is calculated. The start is made initially from range register $i = i_{min}$ in some given corridor (subscript $j_o$). Then, three range registers that are in the corridor where j is found, and in the two adjacent corridors j−1 and j+1 are scrutinized iteratively each time at the next subscript, i+1. The register retained each FIG. 9, that finally, extends from $_{min}$ to $i_{max}$. This is repeated, in time is the one with the least weighted consequence function (and, if necesprinciple, for each of the beginnings of the corridors at $i_{min}$, such as $j_0$. A performance function that is the sum of the consequence functions encountered along the advance determined is associated with the beginning of each corridor, $j_o$, for example. This can be written $$FPR_j = \frac{1}{S_\mu} \cdot \sum_{i_{min}}^{i_{max}} \mu_i FC_{ki}$$

where k is the set of subscripts for the corridors (as a function of i) that traverses the aforesaid advance successively, or the line of least consequence.

It is quicker, in practice, to do this backwards, beginning with the maximum ranges (the subscripts $i_{max}$).

Figure 10:
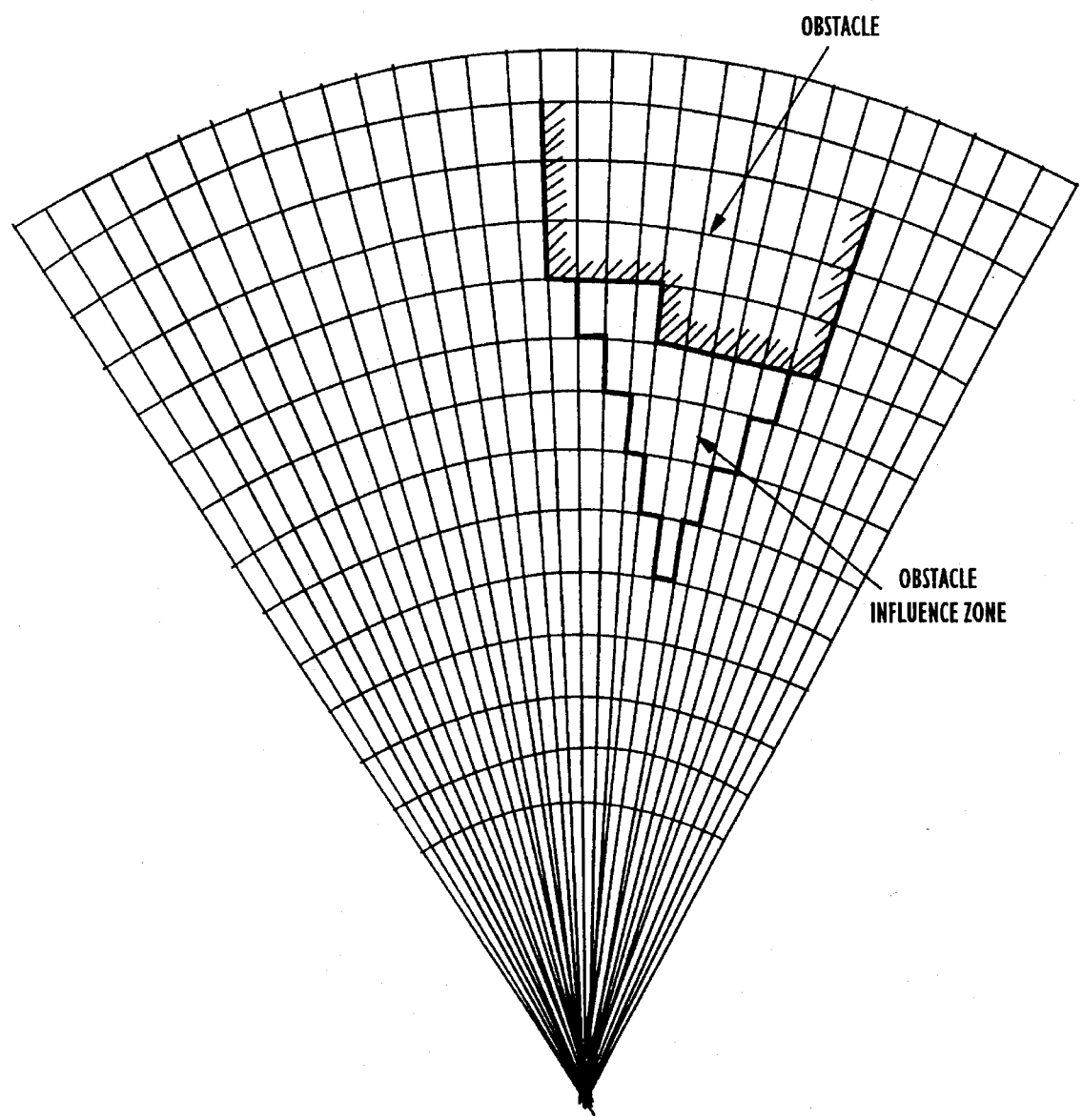

Looking at FIG. 10, which corresponds to the view of an obstacle on flat terrain, note that the zone of obstacle influence is longer in range the greater the discrimination of the corridors in bearing. In order to obtain a reaction range for the aircraft that is satisfactory (while avoiding the terrain), it has turned out to be necessary to adapt bearing discrimination by multiplying the number of corridors by any interpolation between two initial corridors. This adaptation leads, incidentally, to less drastic (or flexible) course change controls.

Degradation function

Designated FPN, this function is determined in order to maintain the aircraft in the present aiming envelope, DV, while at the same time providing best direction of the aircraft toward the aiming point, PV (with DV = DN or DH, and PV = PN or PH, respectively).

Consideration also can be given to all other angle data that can exert an influence on the desirable flight path for the aircraft (threats or directional jamming, in particular). The further question is to seek to cancel aiming angle $\alpha$ (FIG. 1A), and this more especially since $$\begin{cases} \beta_{max} - |\beta| & \text{is small} \\ |\beta| & \text{is large.} \end{cases}$$

The preferred degradatation function can be written $$FPN_j = \rho \times \xi[(\beta_{max} - |\beta|, |\beta|] \cdot \lambda(\theta_j + \alpha_o)$$

where $\rho$ is an adaptation coefficient that can be taken equal to $h_o$;

$\xi$ is a terrain-avoidance hardening coefficient;

$\lambda$ is the actual degrading function centered in $-\alpha_o$ ($\alpha_o$ being tied to the existing route), and $\theta_j$ is the angular displacement of the corridor with respect to the route being flown.

The $\lambda$ function

Figure 11A:
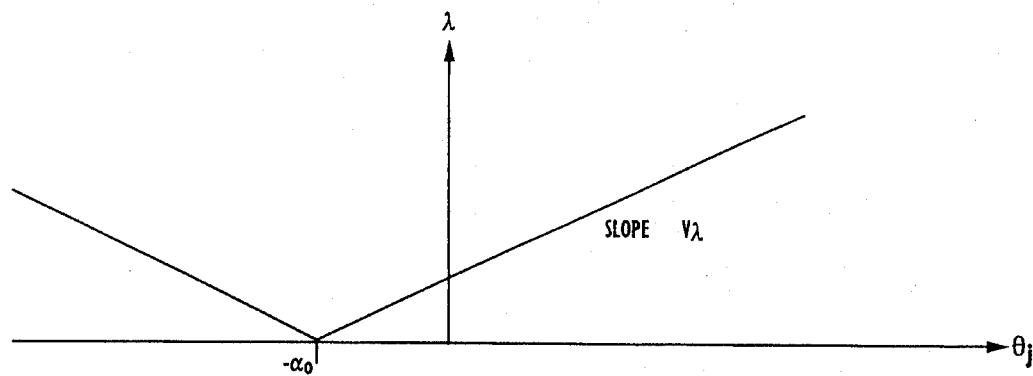
FIGS. 11 (*a, b, c, d*), 12 (*a, b, c*), and 13 (*a, b, c*) are diagrams concerned with the degradation function.

The $\lambda$ function is, by preference, simply defined by two segments of a straight line (FIG. 11a) broken at $\alpha_o$ (for $\theta_j = -\alpha_o$), that is $$\lambda = \mu\lambda \cdot |\theta j + \alpha_o|$$

Figure 11B:
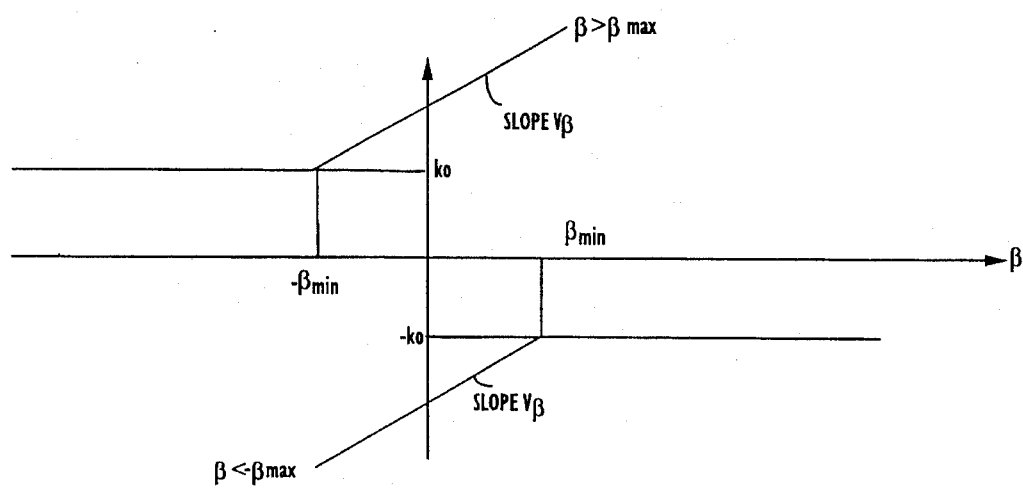

Centering this function in $\alpha_o$ has the following effects:

favors the aiming direction toward PV when the aircraft is in the aiming envelope (DN or DH). It then can be taken that $$\alpha_o = \alpha \text{ if } \beta_{max} - |\beta| \geq 0$$

where $\alpha$ is the angle between the present route and the aiming route;

returns the aircraft to aiming envelope DV, when the aircraft has left it. The definition of $\alpha_o$ then is different. First to be determined is $$\alpha_{test} = \alpha' k(\beta) [|\beta| - \beta_{max} + \Delta\beta_o]$$

where $k(\beta)$ is a function of the form shown in FIG. 11b;

$\Delta\beta_o$ is a control parameter.

If $\epsilon$ is given the sign of $\beta$, then $$\begin{cases} k(\dot\beta) = vk \, (\dot\beta + \epsilon \, \dot\beta_{min}) + \epsilon \, ko & \text{if } \epsilon \cdot \dot\beta \geq -\dot\beta_{min} \\ k(\dot\beta) = \epsilon \, ko & \text{if } \epsilon \cdot \dot\beta < -\dot\beta_{min} \end{cases}$$

This defines k, with vk, $\beta_{min}$, and $k_o$, as the control parameters.

Figure 11C:
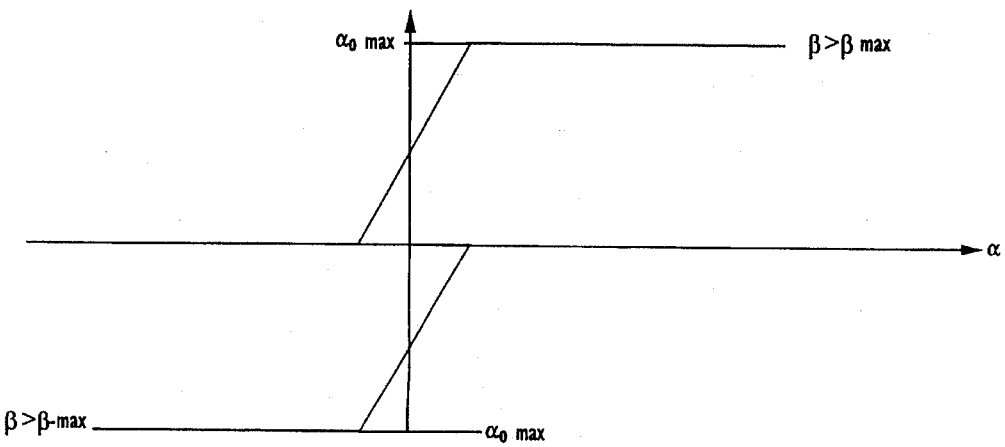
Figure 12A:
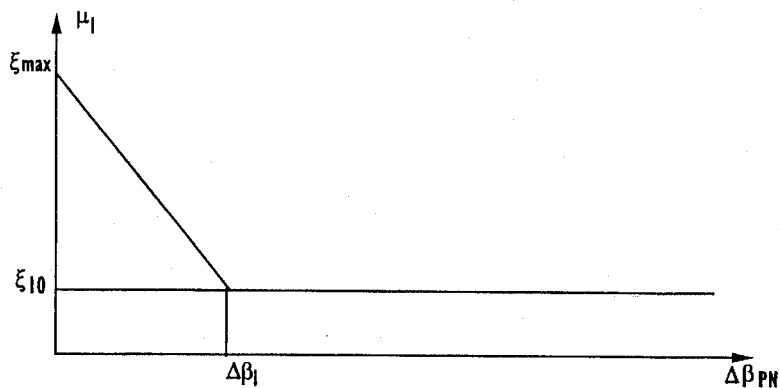
Figure 12B:
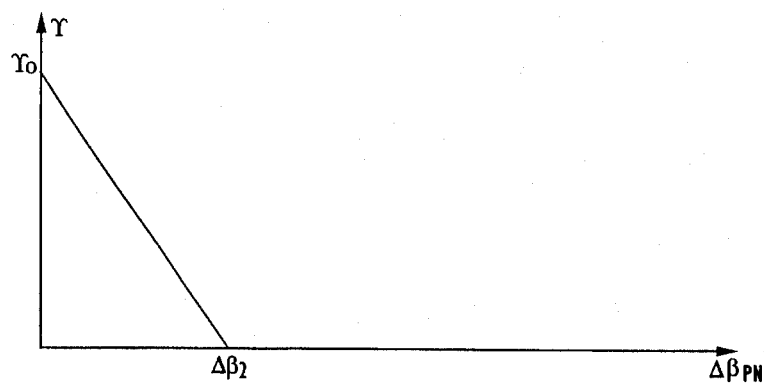
Figure 12C:
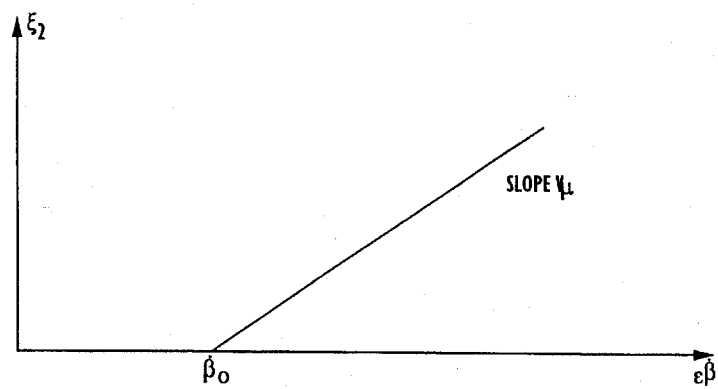
Figure 13A:
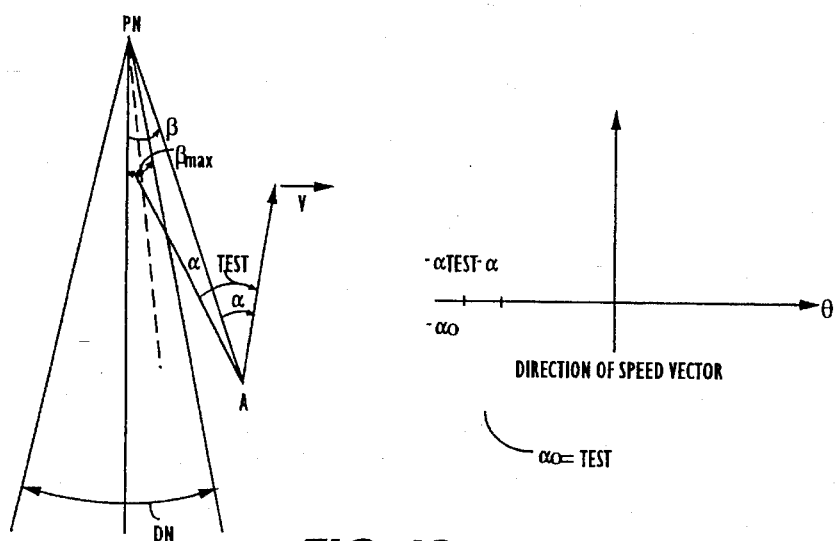
Figure 13B:
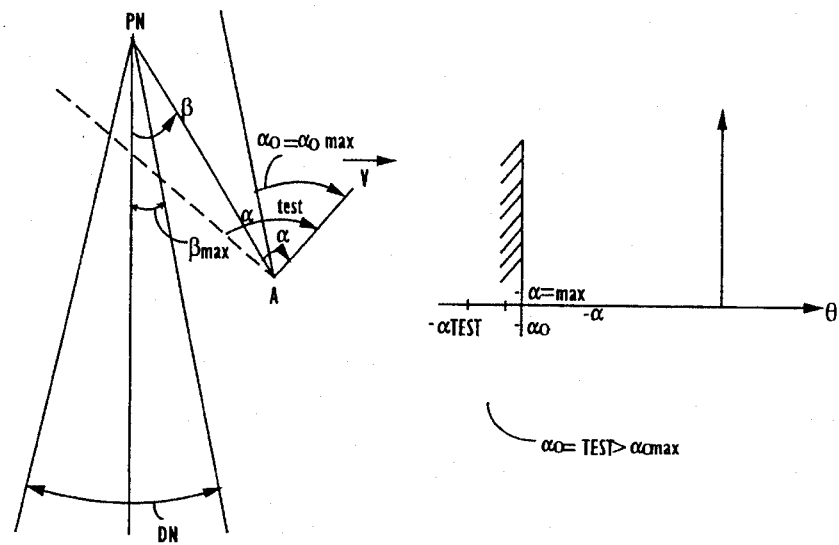
Figure 13C:
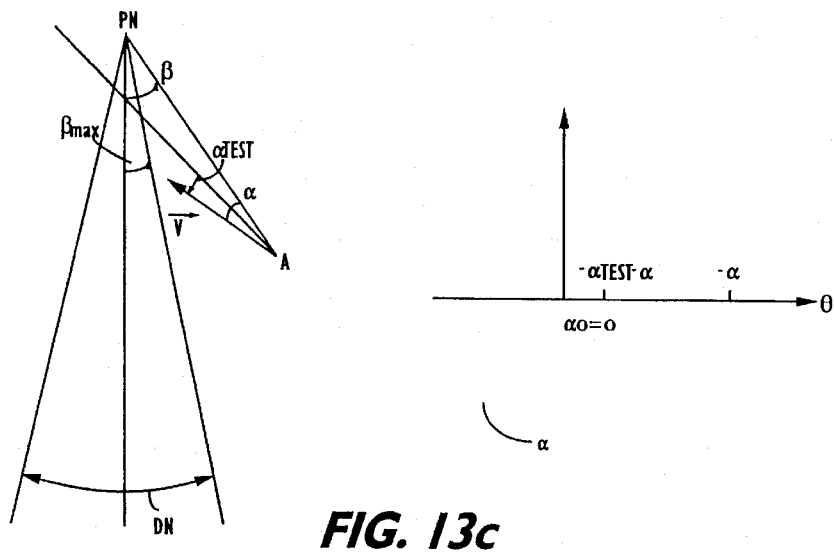

Finally, $\alpha_o$ is defined as follows (FIG. 11c):

$$\begin{aligned} &\alpha_0 = \alpha \text{ if } |\beta| \leq \beta_{max} \\ &\alpha_0 = \epsilon \cdot \alpha_{0\,max} \quad \text{(FIG. 13b) if } \epsilon \cdot \alpha_{test}(\alpha) \geq \alpha_{0\,max} \\ &\alpha_0 = 0 \quad \text{(FIG. 13c) if } \epsilon \cdot \alpha_{test}(\alpha) \leq 0 \\ &\alpha_0 = \alpha_{test}(\alpha) \quad \text{incidentally (FIG. 13a)} \end{aligned} \Bigg\} \text{ if } |\beta| > \beta_{max}$$

where $\alpha_{o\,max}$ is a control parameter.

The expert will understand that if $|\beta| > \beta_{max}$ (the aircraft leaves DN or DH), the aiming route will be displaced (with respect to the normal route of PV = PN or PH) by a quantity that is proportional to the angular deviation $|\beta| - \beta_{max}$, the proportionality factor being greater the greater $|\beta|$, that is, $\beta$ varies more quickly.

The hardening coefficient $\xi$

The Applicant, by using this coefficient, seeks to emphasize the degradation as a function of the urgency of aircraft reaction. This emphasis must come into play on the side of the aiming direction in which the aircraft is in danger of departing from the DV. The coefficient thus must be applied to just one group of numbers for the function $\lambda$. Two cases must be distinguished:

if $\theta_j + \alpha_0 \geq 0$, the following quantities are defined $$\begin{cases} \Delta\beta_P = \beta_{max} - \beta & \text{if } \beta_{max} \geq \beta \\ \Delta\beta_P = 0 & \text{if } \beta_{max} < \beta \end{cases}$$

if $\theta_j + \alpha_0 < 0$, likewise $$\begin{cases} \Delta\beta_N = \beta_{max} + \beta & \text{if } -\beta_{max} \leq \beta \\ \Delta\beta_N = 0 & \text{if } -\beta_{max} > \beta \end{cases}$$

Now $\Delta\beta_P$, or $\Delta\beta_N$, can be designated $\Delta\beta_{PN}$, depending on the case. Then, $$\xi PN(\Delta\beta PN, \dot\beta) = \xi_1(\Delta\beta PN) + \gamma(\Delta\beta PN) \cdot \xi_2(\epsilon \cdot \dot\beta)$$

FUIGS. 12a, 12b, and 12c show the functions $\epsilon_1$, $\gamma$, and $\xi_2$, respectively. Their analytical expressions are:

$$\begin{cases} \xi_1 (\Delta\beta) = \xi_{10} & \text{if } \Delta\beta \geq \Delta\beta_1 \\ \xi_1 (\Delta\beta) = \xi_{max} + \dfrac{\Delta\beta}{\Delta\beta_1} (\xi_{10} - \xi_{max}) & \text{if } \Delta\beta < \Delta\beta_1 \end{cases}$$

control parameters $\tau_{10}$, $\xi_{max}$, $\Delta\beta_1$ $$\begin{cases} \gamma(\Delta\beta) = 0 & \text{if } \Delta\beta \geq \Delta\beta_2 \\ \gamma(\Delta\beta) = \gamma_0 \dfrac{\Delta\beta_2 - \Delta\beta}{\Delta\beta_2} & \text{if } \Delta\beta < \Delta\beta_2 \end{cases}$$

control by $\gamma_o$ and $\Delta\beta_2$ $$\begin{cases} \xi_2 (\epsilon \cdot \dot\beta) = 0 & \text{if } \epsilon\dot\beta \leq \dot\beta_0 \\ \xi_2 (\epsilon \cdot \dot\beta) = v\mu \, (\epsilon \cdot \dot\beta - \dot\beta_0) & \text{if } \epsilon \cdot \dot\beta > \dot\beta_0 \end{cases}$$

control by $v_\mu$ and $\dot\beta_o$.

Figure 14:
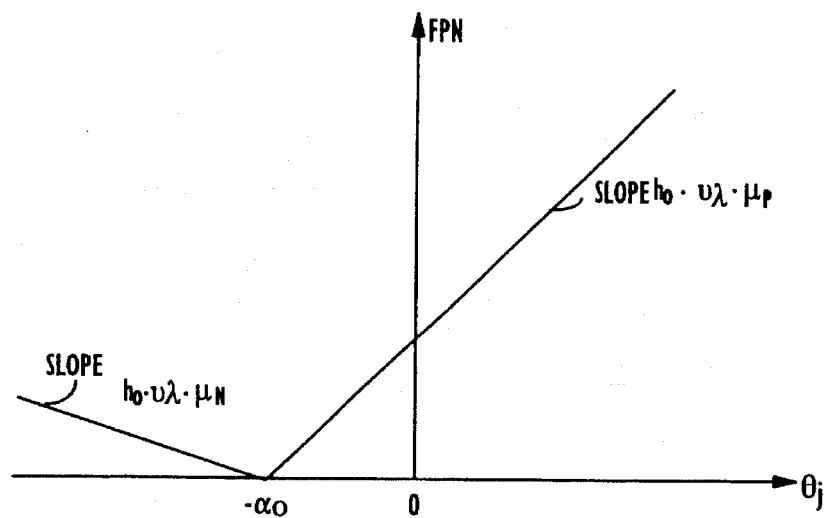
FIG. 14 is a curve illustrating the role of the degradation function.

What is finally obtained in the general case is an asymmetrical degradation function, FPN, the shape of which is shown in FIG. 14.

It is advantageous to complete the function FPN, with one, or several additive terms, taking into account other factors associated with the angle, such as:

air-air threats, enemy fighter planes, for example;

directional jammers;

evaluation as a function of the angle of the chances of survival faced with a volume made up of a dense set of threats (ground-air, in particular).

In practice, if it is desired to interdict the aiming angle, $\alpha$, in order to surpass a maximum value, $\alpha_{max}$, it is sufficient to select the assigned course change from among the set of corridors such that $$|\theta j + \alpha_o| < \alpha_{max}$$

The result will be a set of admissible routes for the aircraft (step 356, FIG. 4). This is the intersection of this set with the possible routes for the aircraft.

If this intersection contains several routes, the expert will understand that the system described retains the best instantaneous route (step 359). This route is "revived" at the 0.5 Hz rate.

In the contrary case (step 358), the assigned route (by default) is de-fined as the boundary of the aiming envelope (DV = DN or DH) closest to the route running directly to the aiming point (PV = PN or PH).

Thus, the invention makes it possible in all cases to define a terrain avoidance command (EDT route) in the horizontal plane. In parallel, the aircraft is fitted with terrain-following equipment, as described, for example, in the above-cited Patent Application, in which a terrain-following command (SDT route) in the vertical plane is defined. Here the combination these two bits of data will be described with the help of FIG. 15 (the functions performed by unit 80, FIG. 1). This detailed description is given for a high-resolution radar [case (b), mentioned above].

The Applicant has observed that during an EDT [terrain-avoidance] maneuver it is not necessary that the SDT [terrain-following] function compel the aircraft to climb.

But, for different reasons (late discovery of a threat, too much of a change in course with respect to the aiming direction, for example), the aircraft can be caused to leave its flight path for a lower altitude. It is necessary to ensure that the aircraft will be able to clear any obstacle that should appear unexpectedly during this maneuver. Two approaches, complementing each other, are anticipated to bring this about:

the path flown by the aircraft takes into consideration at all times possible neighboring reliefs in the vertical plane by providing lateral protection (partial, so as not to cause degradation in flight altitude). This lateral protection is obtained by azimuth scanning (radar) of an angular sector encompassing the aircraft's speed vector;

any course change maneuver is subject to prior system authorization. Authorization is forthcoming if the terrain-following commands calculated for the relief to be overflown do not reach prohibitive values (a load factor in excess of the aircraft-pilot couple possibilities).

In accordance with an important aspect of the invention, this latter is obtained by distinguishing if the aircraft is flying on a straight line, or is in a turn.

Upon departure (step 500, FIG. 15), the path being flown by the aircraft, that is, the terrain-avoidance command supplied, is acquired to calculate the course change that remains to be made.

The terrain-following command is designated α (the vertical component of the load factor normal to the plane of the wings). The terrain-avoidance command is designated $\Delta R_c$ (for the assigned course change).

Straight line

A straight line terrain-following command, $\eta_{LD}$, is calculated in a bearing sector encompassing the speed vector, a sector that includes $N_{LD}$ scanned corridors. If there is an obstacle in this sector, the terrain-avoidance function will generate the avoidance command in good time (thus taking this obstacle into account, at least partially).

Figure 15:
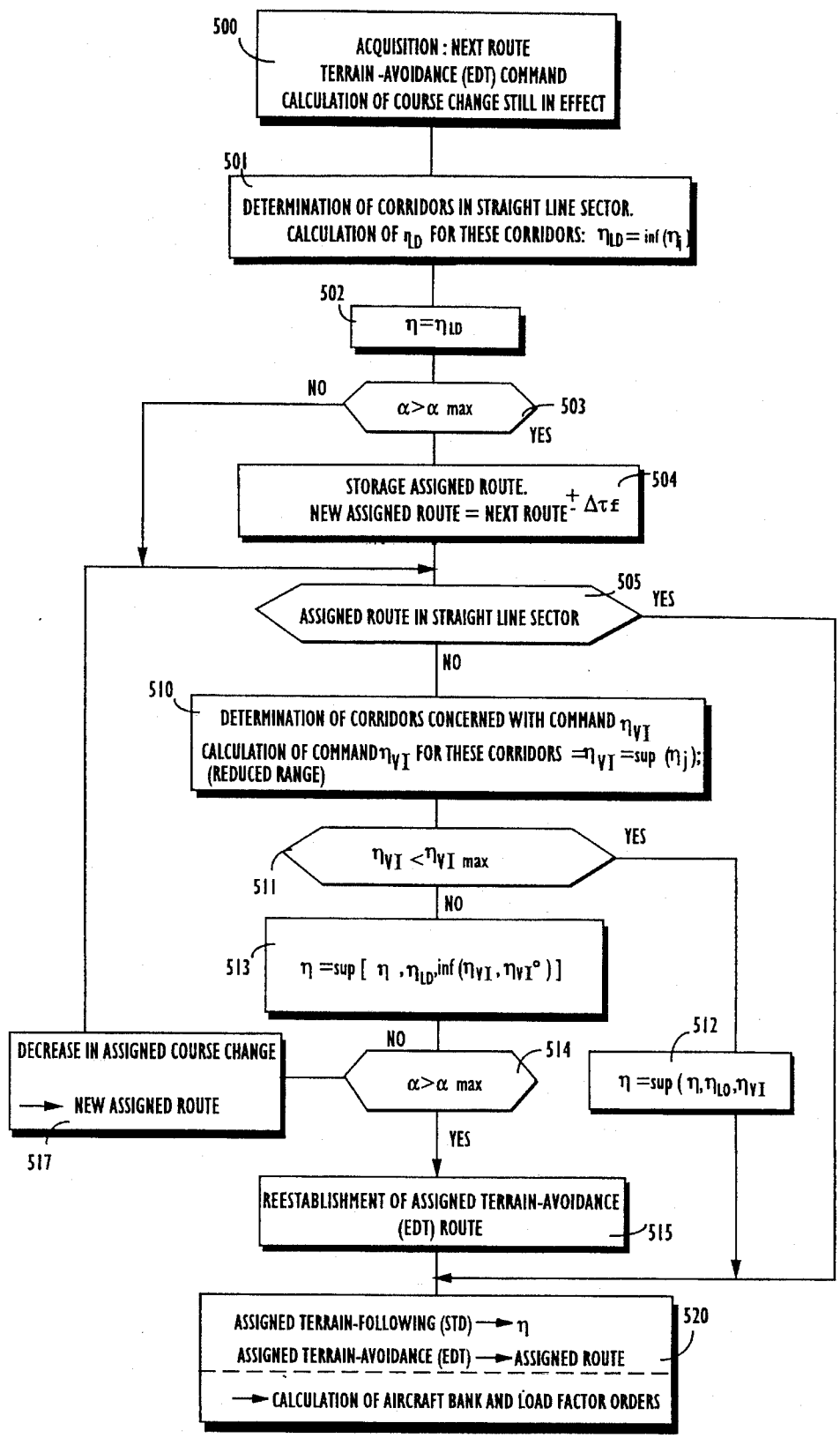
FIG. 15 is a block diagram of the combination of terrain-following and terrain-avoidance commands.

The straight line terrain-following command thus can be written (step 501, FIG. 15)

$$\eta_{LD=inf i}\eta_i, \text{ where } i=1, N_{LD}$$

and where $\eta_i$ is the terrain-following command, calculated in each corridor (in accordance with the already cited patent).

The expert will understand that an $\eta_{LD}$ command such as this makes possible correct flight out of a "blind" valley (the most precarious case), without degradation of the altitude at which the aircraft is flying, in the general case.

The terrain-following command is $\eta=\eta_{LD}$ (step 502, FIG. 15) as long as the assigned course change, $\Delta R_c$, is within the "straight line" sector.

Meanwhile, step 503 tests to see if $\alpha>\alpha_{max}$. If yes (step 504), the assigned route is stored but is replaced by the next route $\pm\Delta R_f$ ($\Delta R_f$ defining an outright course change that is less than that assigned in accordance with what has been described above).

Test 505 then is made to see if the assigned route is within the sector of the straight line. If yes, passage to final step 520 confirms the fact that $\eta=\eta_{LD}$ for the terrain-following command; and that $\Delta R=\Delta R_c$ for the terrain-avoidance command.

The contrary case is a turn.

Turn

Figure 16:
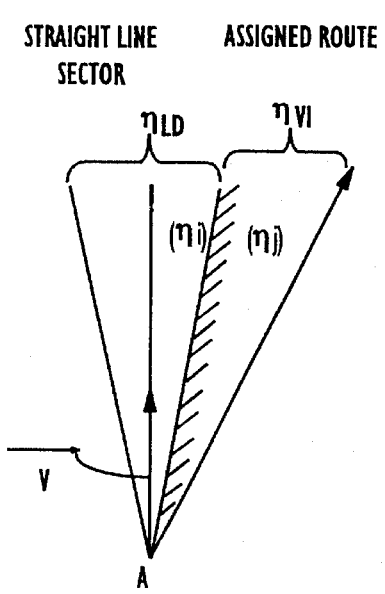
FIGS. 16 and 17 are two diagrams illustrating the advantages of the aforesaid combination.

In this case the calculation also includes a supplementary terrain following command for the turn, designated $\eta_{VI}$, from $\eta_j$ n each of the corridors separating the assigned route from the neighboring boundary of the straight line sector (FIG. 16).

A terrain-following command, $\eta_j$, is determined as before in each corridor, subscript j, of sector "VI," but the scanning range is reduced with respect to that used for all preceding $\eta_i$.

This range reduction makes it possible to avoid "climbing" an obstacle that should be avoided. Then (step 510)

$$\eta_{VI} = \sup_j (\eta_j)$$

It will be recalled that "inf" and "sup" are functions designating the smallest and the largest elements of a set, respectively.

Step 511 then compares $\eta_{VI}$ with a maximum permissible $\eta_{VI\ max}$. If the test is favorable, step 512 establishes the terrain-following command as:

and this process too passes to final step 520, which adds the corresponding terrain-avoidance command, unmodified, to the assigned route. The inclusion of η in the "sup" function means that any preceding η value calculated will not be reduced in a turn, for safety reasons the expert will understand.

On the other hand if the output from test 511 shows that $\eta_{VI}$ exceeds the maximum, it is considered that the aircraft cannot make the turn under adequate safety conditions. The acceptable load factor in a turn is designated $\eta_{VI}$. Step 513 provisionally fixes $$\eta=\sup\ [\eta, \eta_{LD}, \inf(\eta_{VI}, \eta_{VI})]$$

Test 514 then determines if α exceeds the threshold $\alpha_{max}$, and if it does the assigned terrain-avoidance route is reestablished by 515 (thus accepting, reluctantly, a climb in altitude) and final step 520 confirms the provisional terrain-following command η (step 513) and the terrain-avoidance command.

If $\alpha<\alpha_{max}$, test 514 is exited via step 517, which reduces the assigned course change $\Delta R_c$, and the result is a new assigned route that is closer to the sector containing the straight line. The calculation of $\eta_{VI}$ is repeated by step 505 until an $\eta_{VI}$ value acceptable to test 511 is obtained, or until the sector containing the straight line is retrieved.

Noting that in a turn, η is defined by the largest $\eta_j$, a reduction in the width of sector "VI" will avoid having to take into consideration an obstacle of reduced size present in this sector. Further, any significant course change is avoided by making this reduction toward the sector containing the straight line.

Figure 17:
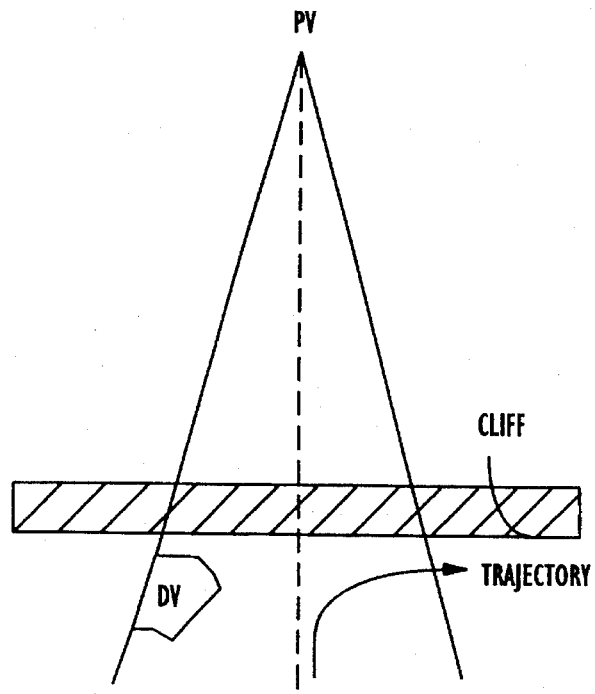

A ticklish problem arises when an aircraft is faced by a cliff (or other wide and steep obstacle). The expert will understand that the use of the block diagram in FIG. 15 (particularly steps 503, 513, and 514) will enable the aircraft to clear the cliff without being completely diverted, as illustrated by the arrow in FIG. 17.

It will be understood that the present invention is not limited to the mode of realization described, and that it can be the subject of variants, particularly by using equivalent facilities.

We claim:

1. A method for the generation of command signals for an aircraft, said aircraft overflying a region at a low-altitude, said method comprising the steps of:

a) storing in a first memory a set of terrain-data representing topography of said region;

b) storing in a second memory an ordered plurality of sets of at least three digital values, two of said digital values defining the coordinates in an horizontal plane of a target point, and at least another one of said digital values defining a target area surrounding said target point, whereby at least one possible flight path is defined by a sequence of target points, c) acquiring data representing a current position and a current speed vector of the aircraft;

d) selecting a current target point;

e) determining at least one aiming domain, said aiming domain comprising an angular sector substantially inscribing said target area associated with said current target point, and a bisector of said angular sector passing substantially through said current target point and an adjacent target point in said sequence of target points, with said angular sector expanding towards said aircraft;

f) scanning a plurality of bearing corridors that the aircraft can presently enter, and for each such bearing corridor;

f1) determining, from said set of terrain-data, a corresponding digital performance value, as a function of a predetermined set of criterium including desired aircraft flight altitude, said digital performance value comprising an evaluation of an optimum path amongst possible paths starting along each such bearing corridor;

f2) determining a digital degradation value responsive to the bearing corridor being considered and the said aiming domain, by utilizing a digital degradation function, such degradation function correcting said aircraft toward said aiming domain, correction magnitude being in proportion to any deviation from said aiming domain;

g) determining route components in said horizontal plane of a current commanded route vector, based on the performance and degradation values associated with said scanned bearing corridors and generating therefrom corresponding command signals to the aircraft; and h) selectively repeating steps c) through g) until said aircraft position satisfies predetermined conditions with respect to said aiming domain.

2. The method according to claim 1, wherein step f1) comprises:

f11) subdividing each said bearing corridor into a plurality of range cells, and defining a maximum bearing deviation;

f12) determining, for each such cell, a digital cost value, as a function of said predetermined set of criterium including the flight altitude; and f13) determining said digital performance value from the weighted sum of the sequence of cost values encountered when following each possible path starting along said corresponding direction and following step by step said range cells with, at each step, an authorized bearing deviation at most equal to said maximum bearing deviation.

3. Method according to claim 2, wherein step f12) comprises:

f121) detecting, for a current range cell of a current bearing corridor, the current actual flight altitude corresponding to said current range cell;

f122) determining the greatest flight altitude value among all flight altitude values respectively associated with all range cells of said current corridor preceding said current range cell;

f123) comparing said current actual flight altitude and said greatest flight altitude value, and assigning to said current range cell as a current flight altitude value, the larger of said greatest altitude value and said current actual flight altitude;

f124) repeating steps f121) through f123) for all range cells of said current bearing corridor; and f125) repeating steps f121) through f124) for all bearing corridors.

4. Method according to claim 2, wherein step f13) comprises taking into account, for each range cell of each bearing corridor, a predetermined lateral clearance to obstacle present in at least a corridor adjacent to said each bearing corridor.

5. Method according to claim 2, wherein the weighted sum of the sequence of cost values of step f13) is determined as a hyperbolic function of the range.

6. Method according to claim 1, wherein step g) comprises:

g1) determining terrain-avoidance command signals associated with said route components in said horizontal plane of said current commanded route vector, according to a first predetermined determination scheme;

g2) determining, from said route components in said horizontal plane of said current commanded route vector, terrain-following command signals, according to a second predetermined determination scheme, whereby components of said current commanded route vector in a vertical plane are defined; and g3) combining said terrain-avoidance commands and said terrain-following commands into said aircraft command signals.

7. Method according to claim 6, wherein said first predetermined determination scheme of step g1) comprises:

defining a straight line passing through the current position of the aircraft and the apex of said angular sector of said aiming domain;

defining an aiming angle between said horizontal current commanded route vector and said straight line;

evaluating whether or not said aiming angle is less than a predetermined maximum value defining a maximum aiming angle;

determining said terrain-avoidance command signals according to one of a first sub-criterium and a second sub-criterium, said second sub-criterium different from said first sub-criterium, depending upon the result of said evaluation; and wherein said second predetermined determination scheme of step g2) comprises:

determining the horizontal current projection of said current speed vector in said horizontal plane;

defining a so-called "straight line" sector including said horizontal current projection and a predetermined number of directions among said plurality of bearing corridors that the aircraft can presently enter into;

evaluating whether or not said current commanded route vector belongs to said "straight line" sector; and determining said terrain-following command signals according to one of a third sub-criterium and a fourth sub-criterium, said fourth sub-criterium different from said third sub-criterium, depending upon the result of said evaluation.

8. Method according to claim 1, wherein step e) comprises:

determining a navigation domain and a guidance domain, both domains comprising an angular sector expanding towards said aircraft;

said navigation domain being open and containing a direction passing through the preceding target point and the current target-point;

said guidance domain being closed and having an axis substantially coinciding with the bearing corridor passing through said current target-point and a next target-point; and said predetermined conditions of step h) comprises:

said aiming domain being said navigation domain, until the aircraft penetrates said guidance domain, in which case said aiming domain is then said guidance domain; and when the aircraft position satisfies predetermined sub-conditions involving a current target point, considering a next target point as a new current target point at step d), with said aiming domain being then the navigation domain associated to that new current target point.

9. Method according to claim 8, wherein said predetermined sub-conditions comprise one of:
   the aircraft penetrating the target area associated with said new current target point and approaching, in a predetermined manner, said axis of said guidance domain; and
   the aircraft penetrating a forced switching domain outside said guidance domain, and outside the target area associated to said new current target point, with an upstream limit of said forced switching domain being substantially the bisector of the angle formed by said preceding target point, said new current target point, and said next target point.

10. Method according to claim 8, wherein said degradation function is adapted for enabling a constraining servo-ing command when the aircraft is in said guidance domain, and a flexible servo-ing command when the aircraft is in said navigation domain.

11. Method according to claim 8, wherein said predetermined sub-conditions comprise the aircraft having penetrated said guidance domain and there encountering a threat.

12. Method according to claim 8, wherein boundaries of said navigation domain and of said guidance domain make a predetermined angle with the respective bearing corridors passing through said preceding, current and next target points;
   wherein said guidance domain is tangent to the current target area, and is closed, outside of said current target area and opposite to an apex of said guidance domain, by a predetermined curve such that, if the aircraft arrives at a tangent to said curve, said aircraft can stay inside said guidance domain;
   wherein said navigation domain passes a first tangency point between the guidance domain and the current target area, on an acute side of the angle formed by said preceding target point, said current target point, and said next target point, said navigation domain being tangent at a second tangency point of the current target area on another side of said angle formed by said preceding target point, said current target point, and said next target point; and
   wherein said controlled switching domain includes a downstream side half-plane delimited by a straight line joining said first and second tangency points to the exclusion of said guidance domain and said current target area.

13. Method according to claim 1, wherein step f2) of determining the degradation value comprises:
   defining a straight line passing through the current position of the aircraft and the apex of said angular sector of said aiming domain;
   determining a first angle between said straight line and the axis of said aiming domain;
   determining the temporal derivative of said first angle;
   determining the horizontal current projection of said current speed vector in said horizontal plane; and
   determining a second angle between said straight line and said horizontal current projection.

14. An apparatus for the generation of automatic command signals for an aircraft, overflying a region at a low altitude comprising:
   a first memory means for storing a set of terrain-data representing topography of said region;
   a second memory means for storing an ordered plurality of sets of at least three digital values, two of said digital values defining the coordinates in an horizontal plane of a target point, and at least another one of said digital values defining a target area surrounding said tract point, whereby at least one possible flight path is defined by a sequence of target points;
   acquisition means for acquiring data representing a current position and a current speed vector of the aircraft;
   first processing means for selecting a current target point, and determining at least one aiming domain, said aiming domain comprising an angular sector substantially inscribing said target area associated with said current target point, and a bisector of said angular sector passing substantially through said current target point and an adjacent target point in said sequence of target points with said angular sector expanding towards said aircraft;
   a high speed processing means for scanning a plurality of bearing corridors that the aircraft can presently enter into, and for each such bearing corridor said high speed processing means including means for:
   determining from said set of terrain-data, a corresponding digital performance value, as a functions of a predetermined set of criterium including the flight altitude, said digital performance value comprising an evaluation of an optimum path amongst possible paths starting along the bearing corridor;
   determining a digital degradation value responsive to the bearing corridor being considered and said aiming domain, by utilizing a digital degradation function, such degradation function correcting said aircraft toward said aiming domain where magnitude of any correcting is in proportion to any deviation from said aiming point;
   determining route components in said horizontal plane of a current commanded route vector, based on the performance and degradation values associated with said scanned bearing corridors and generating therefrom corresponding command signals to the aircraft; and
   control means, selectively responsive to said acquisition means, said first processing means, and said high-speed processing means, for controlling said aircraft until said aircraft positions satisfies predetermined conditions with respect to said aiming domain.

15. Device according to claim 14, wherein said high-speed processing means comprises:
   means for determining terrain-avoidance command signals associated with said components in said horizontal plane of said current commanded route vector, according to a first predetermined determination scheme;
   means for determining, from said components in said horizontal plane of said current commanded route vector, terrain-following command signals, according to a second predetermined determination scheme, whereby components of said current commanded route vector in a vertical plane are de fined, and
   means for combining said terrain-avoidance commands and said terrain-following commands into said aircraft command signals.

* * * * *